(12) United States Patent
Kim

(10) Patent No.: US 9,923,421 B2
(45) Date of Patent: Mar. 20, 2018

(54) ROTOR STRUCTURE FOR MOTOR

(71) Applicant: MANDO CORPORATION, Pyeongtaek-si (KR)

(72) Inventor: Jong Hyun Kim, Yongin-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 182 days.

(21) Appl. No.: 14/708,188

(22) Filed: May 9, 2015

(65) Prior Publication Data
US 2015/0326076 A1    Nov. 12, 2015

(30) Foreign Application Priority Data

May 9, 2014  (KR) .................. 10-2014-0055838

(51) Int. Cl.
H02K 1/24    (2006.01)

(52) U.S. Cl.
CPC .......... H02K 1/24 (2013.01); *H02K 2205/12* (2013.01)

(58) Field of Classification Search
CPC ............ H02K 1/24; H02K 1/26; H02K 1/148; H02K 1/30; H02K 1/28
USPC ................... 310/216.001–216.137
See application file for complete search history.

(56) References Cited

U.S. PATENT DOCUMENTS

| 5,949,172 A * | 9/1999 | Katagiri ............ H02K 1/24 29/596 |
| 6,064,132 A * | 5/2000 | Nose ................ H02K 1/08 310/216.016 |
| 2005/0253476 A1* | 11/2005 | Zhong ............... H02K 1/08 310/216.064 |
| 2006/0091759 A1 | 5/2006 | Migita et al. |

FOREIGN PATENT DOCUMENTS

| CH | WO 2013007296 A1 * | 1/2013 | ........... H02K 1/26 |
| CN | 103545947 | 1/2014 | |
| DE | 102011121793 | * 6/2013 | ........... H02K 1/24 |
| KR | 10-1370655 | 2/2014 | |

OTHER PUBLICATIONS

Machine Translation, Reinhardt et al., DE 102011121793 A1, Jun. 27, 2013.*
Office Action dated Apr. 14, 2017 for Chinese Patent Application No. 201510237429.7 and its English machine translation by Google Translate.

* cited by examiner

*Primary Examiner* — Thomas Truong
(74) *Attorney, Agent, or Firm* — Ladas & Parry, LLP

(57) ABSTRACT

A rotor structure for a motor includes: a core body in which a shaft passes through an axial center and teeth are radially arranged along an outer circumference and include first slide connection portions at front ends; field windings individually wound around outer circumferences of the teeth and maintaining a state of being spaced apart from one another while being wound around the teeth; and a cylindrical core tip part configured to surround the outside of the core body, (Continued)

the cylindrical core tip part including second slide connection portions in an inner circumference such that the front ends of the teeth are slidably connected thereto along an axial direction through a mating engagement.

10 Claims, 4 Drawing Sheets

ROTOR STRUCTURE FOR MOTOR

CROSS-REFERENCE(S) TO RELATED APPLICATION

This application claims priority of Korean Patent Application No. 10-2014-0055838, filed on May 9, 2014, in the Korean Intellectual Property Office, which is hereby incorporated by reference in its entirety.

BACKGROUND OF THE INVENTION

Field of the Invention

The present invention relates to a rotor structure for a motor, and more particularly, to a rotor structure for a motor, in which teeth and a core tip part integrally formed in the outside are slidably connected together through a mating engagement, whereby the field windings can be easily wound around the teeth and the assembling time can be reduced accordingly.

Description of the Related Art

Generally, motors are devices that convert electrical energy into mechanical energy to acquire rotational power.

The motors are classified into DC motors and AC motors according to a type of external power. The motor includes a stator and a rotor (or an armature).

The motor operates based on the principle that the rotational torque is generated in the rotor by a rotating magnetic field generated when a current flows through a wound coil.

One of the motors is a wound-rotor motor in which field windings are wound around teeth of a rotor. In the wound-rotor motor, the field windings are wound by inserting needles through slots formed at front ends of the radially protruding teeth.

By the way, in an existing wound-rotor motor, it is necessary to form slots widely so as to insert the needles thereinto. Therefore, a fill factor of the coils is low and a winding time increases, resulting in an increase an entire manufacturing time.

In addition, it is apprehended that the field windings wound around the teeth will escape through the slots due to a centrifugal force generated by a high-speed rotation of the rotor at the time of driving the motor As a prior art document associated with the present invention, Korean Patent Registration No. 10-1370655 (2014, Feb. 27) discloses a wound rotor synchronous motor.

SUMMARY OF THE INVENTION

An aspect of the present invention is directed to a rotor structure for a motor, in which field windings are wound around teeth in a state in which a core body is separated from a core tip part, and the teeth are slidably connected to the core tip part through a mating engagement, whereby the field windings can be easily wound around the teeth, the assembling time can be reduced accordingly, and the field windings are not separated from the teeth by a centrifugal force.

According to an embodiment of the present invention, a rotor structure for a motor includes: a core body in which a shaft passes through an axial center and teeth are radially arranged along an outer circumference and include first slide connection portions at front ends; field windings individually wound around outer circumferences of the teeth and maintaining a state of being spaced apart from one another while being wound around the teeth; and a cylindrical core tip part configured to surround the outside of the core body, the cylindrical core tip part including second slide connection portions in an inner circumference such that the front ends of the teeth are slidably connected thereto along an axial direction through a mating engagement.

The first slide connection portion may be a concave groove having a length in an axial direction of the core body and become wider backward from an opened front end, and the second slide connection portion may be a concave protrusion that is slidably connected to the first slide connection portion through a mating engagement.

The core tip part may include a plurality of through-holes formed along a circumferential direction so as to insert needles through spacing portions of the teeth from the outside at the time of winding the field windings.

The plurality of through-holes may be formed along an axial direction of the core tip part.

A plurality of planar surfaces, on which the teeth are to be disposed, may be formed along an inner circumferential surface of the core tip part at regular intervals, and the through-holes may be formed at adjacent portions of the planar surfaces.

The rotor structure may further include concave grooves in the inner circumferential surface of the core tip part, wherein the concave grooves have a length along an axial direction and are thinner at positions of the through-holes.

The first slide connection portion and the second slide connection portion may be integrally connected to each other by using a separate fastening member or an adhesive when being slidably connected to each other through a mating engagement.

DETAILED DESCRIPTION OF EXEMPLARY EMBODIMENTS

Exemplary embodiments of the present invention will be described below in detail with reference to the accompanying drawings.

The advantages and features of the present invention and methods for achieving them will become more apparent from the following embodiments that are described in detail in conjunction with the accompanying drawings.

However, the present invention is not limited to the following embodiments and may be embodied in various forms. These embodiments are provided so that this disclosure will be thorough and complete, and will fully convey the scope of the invention to those skilled in the art. The scope of the present invention is defined by the appended claims.

Therefore, detailed descriptions of well-known technologies will be omitted since they would unnecessarily obscure the subject matters of the present invention.

Figure 1:
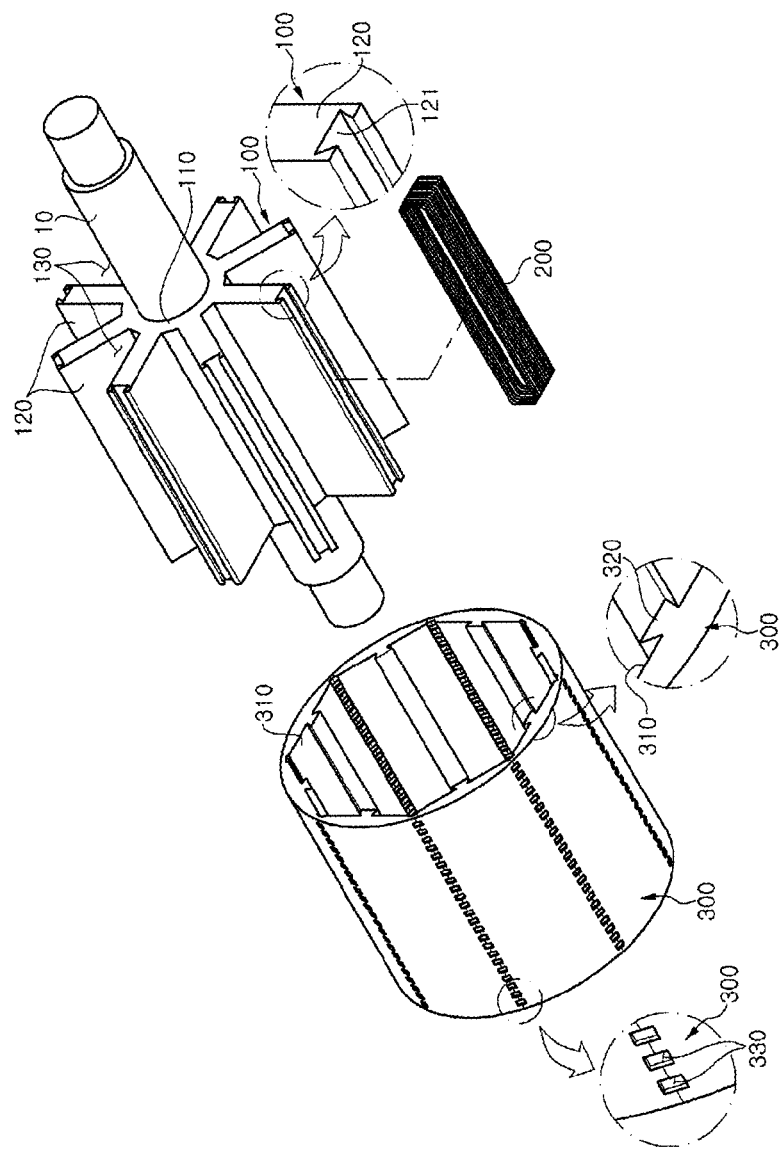
FIG. 1 is an exploded perspective view illustrating a rotor structure for a motor according to the present invention.
Figure 2:
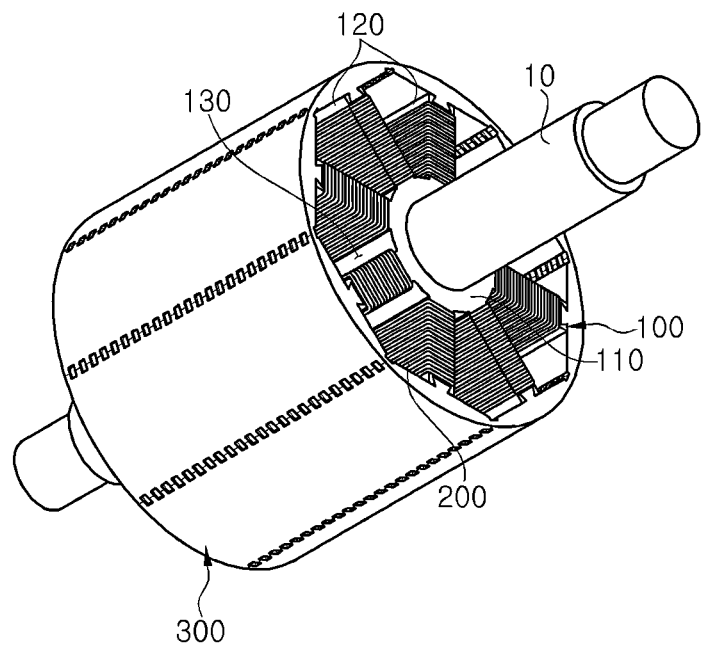
FIG. 2 is an assembled perspective view illustrating the rotor structure for the motor according to the present invention.

FIG. 1 is an exploded perspective view illustrating a rotor structure for a motor according to the present invention, and FIG. 2 is an assembled perspective view illustrating the rotor structure for the motor according to the present invention.

Figure 3:
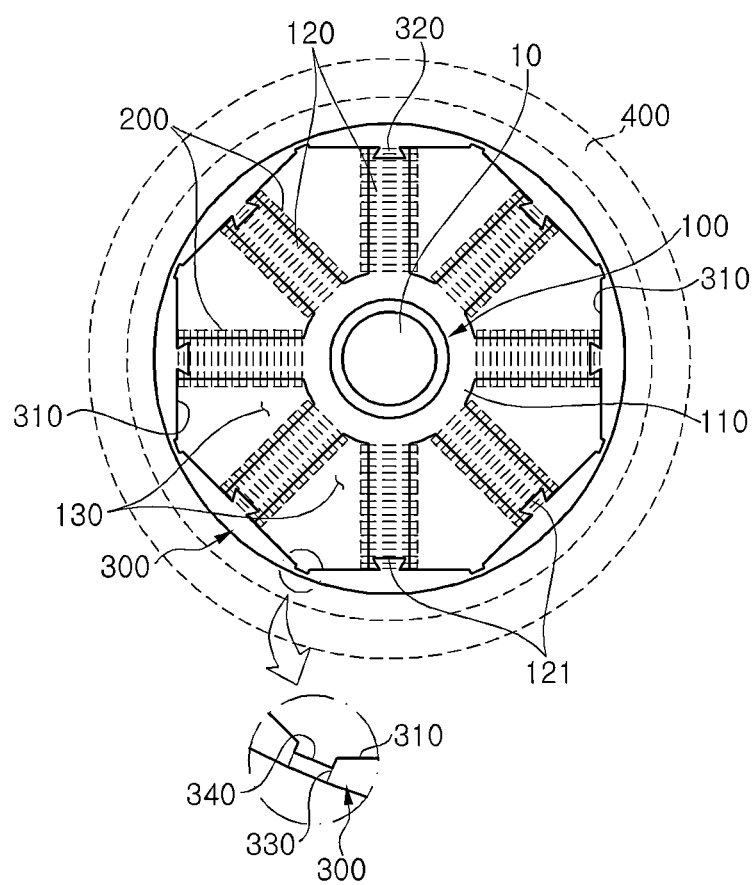
FIG. 3 is a plan view illustrating the rotor structure for the motor according to the present invention.
Figure 4:
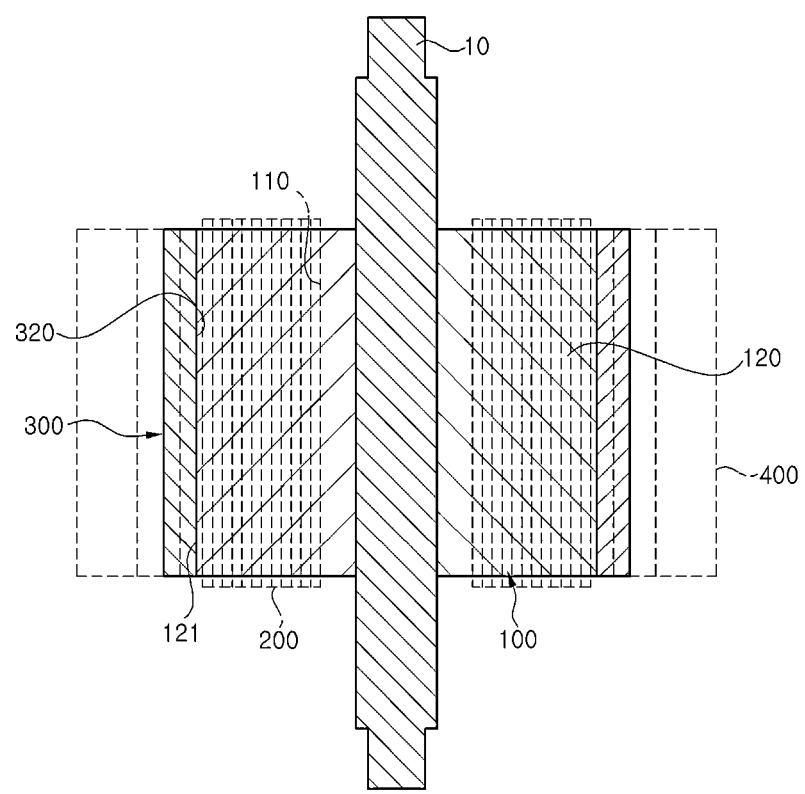
FIG. 4 is a front cross-sectional view illustrating the rotor structure for the motor according to the present invention.

FIG. 3 is a plan view illustrating the rotor structure for the motor according to the present invention, and FIG. 4 is a front cross-sectional view illustrating the rotor structure for the motor according to the present invention.

Referring to FIGS. 1 to 3, the rotor structure for the motor according to the present invention includes a core body 100, field windings 200, and a core tip part 300.

A shaft 10 passes through an axial center of the core body 100, and teeth are radially arranged along an outer circumference of the core body 100. Each of the teeth includes a first slide connection portion 121 at a front end.

A shaft connection portion 110 is formed in the center of the core body 100 to allow the shaft 10 to pass through the core body 100 along an axial direction.

The shaft connection portion 110 may have a cylindrical shape, and a hollow corresponding to the outer shape of the shaft 10 is formed to pass through the center of the shaft connection portion 110 in an axial direction.

The first slide connection portion 121 is a concave groove having a length in the axial direction of the core body 100.

In addition, a width of the first slide connection portion 121 may increase backward from the opened front end.

For example, as illustrated in FIG. 3, the first slide connection portions 121 and second slide connection portions 320 to be described later may have a triangular shape corresponding to a male/female structure.

That is, the first slide connection portion 121 and the second slide connection portion 320 have a connection structure that is connectable to each other in an axial direction but is inseparable from each other in a width direction, that is, a rotational direction.

The teeth 120 are formed to protrude radially from the outer circumference of the shaft connection portion 110. The teeth 120 are formed to have a length along the axial direction of the shaft connection portion 110.

The teeth 120 may be arranged along the outer circumference of the shaft connection portion 110 at regular intervals, and spacing portions 130 are formed between the teeth 120.

The spacing portions 130 define spaces such that the field windings 200 are disposed in a state of being wound around the teeth 120.

The field windings 200 are individually wound around the outer circumferences of the teeth 120 and maintain a state of being spaced apart from one another while being wound around the teeth 120.

As described above, the field windings 200 may be individually installed in the teeth 120 in a state of being latched to the outer circumference of the shaft connection portion 110 and an inner circumference of the core tip part 300 to be described below.

The core tip part 300 is connected to the core body 100 to surround the core body 100. The core tip part 300 includes the second slide connection portions 320 formed along an inner circumference such that front ends of the teeth 120 are slidably connected thereto in an axial direction through a mating engagement.

The second slide connection portions 320 are concave protrusions formed to be slidably connected to the above-described first slide connection portions 121 through a mating engagement.

The second slide connection portion 320 has a shape corresponding to the first slide connection portion, and a front end of the second slide connection portion 320 becomes wider along a protruding direction.

As described above, the second slide connection portion 320 has a connection structure that is connectable to the first slide connection portion 121 in an axial direction but is inseparable from the first slide connection portion 121 in a width direction, that is, a rotational direction.

On the other hand, the first slide connection portion 121 and the second slide connection portion 320 may be integrally connected to each other by using a separate fastening member (not illustrated) or an adhesive (not illustrated) when being slidably connected to each other through the mating engagement.

In addition, the core tip part 300 may include a plurality of through-holes 330 along a circumferential direction so as to insert needles through the spacing portions of the teeth 120 from the outside at the time of winding the field windings 200.

The plurality of through-holes 330 are formed along the axial direction of the core tip part 300 and the number of the through-holes 330 is equal to the number of the teeth 120.

The through-holes 330 may be formed in a rectangular shape having a length in the circumferential direction of the core tip part 300. However, if necessary, the through-holes 330 may be formed to have various shapes.

Furthermore, a plurality of planar surfaces 310, on which the teeth 120 are to be disposed, may be formed along the inner circumferential surface of the core tip part 300 at regular intervals, and the through-holes 330 may be formed at adjacent portions of the planar surfaces 310.

In the inner circumferential surface of the core tip part 300, concave grooves 340 may be further formed to have a length along an axial direction. The concave grooves 340 are thinner at the positions of the through-holes 330.

The above-described rotor structure for the motor may be rotatably mounted within a hollow of a stator 400 as illustrated in FIGS. 3 and 4.

According to the present invention, the field windings 200 are wound around the teeth 120 in a state in which the core body 100 is separated from the core tip part 300, and the teeth 120 are slidably connected to the core tip part 300 through the mating engagement. Thus, the field windings 200 can be easily wound around the teeth 120 and the assembling time can be reduced accordingly.

Since the core body 100 is connected to the core tip part 300 in a direction perpendicular to a rotational direction, and therefore, the core body 100 is hardly separated from the core tip part 300 by a centrifugal force caused by rotation, thereby obtaining a strong engagement force.

In addition, by integrally forming the core tip part 300, it is possible to prevent unbalance caused by the shape thereof, thereby improving device operation performance, reducing the number of elements, and preventing leakage of magnetic flux.

The rotor structure for the motor according to the present invention has been described, but it is obvious that various modifications can also be made without departing from the scope of the present invention.

Therefore, the scope of the present invention should not be defined not by the detailed description of the embodiments but by the appended claims and their equivalents.

It should be understood that the above-described embodiments are exemplary in all aspects and are not intended to limit the scope of the present invention. It should be construed that the scope of the present invention is defined by the appended claims rather than the detailed description, and all changes and modifies derived from the meaning and scope of the claims and their equivalents will fall within the scope of the present invention.

DESCRIPTION OF REFERENCE NUMERALS

| | |
|---|---|
| 10: shaft | 100: core body |
| 110: shaft connection portion | 120: teeth |
| 121: first slide connection portion | 130: spacing portion |
| 200: field winding | 300: core tip part |
| 310: planar surface | 320: second slide connection portion |
| 330: through-hole | 340: concave groove |
| 400: stator | |

What is claimed is:

1. A rotor structure for a motor, comprising:
a core body in which a shaft passes through an axial center and teeth are radially arranged along an outer circumference and include first slide connection portions at front ends;
field windings individually wound around outer circumferences of the teeth and maintaining a state of being spaced apart from one another while being wound around the teeth; and
a cylindrical core tip part configured to surround the outside of the core body, the cylindrical core tip part including second slide connection portions in an inner circumference such that the front ends of the teeth are slidably connected thereto along an axial direction through a mating engagement,
wherein the core tip part comprises through-holes formed along an axial direction of the core tip part and concave grooves formed in an inner circumferential surface of the core tip part having a length along an axial direction at positions of the through-holes.

2. The rotor structure according to claim 1, wherein the first slide connection portion is a concave groove having a length in an axial direction of the core body and becomes wider backward from an opened front end, and
the second slide connection portion is a concave protrusion that is slidably connected to the first slide connection portion through a mating engagement.

3. The rotor structure according to claim 1, wherein the through-holes are formed along a circumferential direction so as to insert needles through spacing portions of the teeth from the outside at the time of winding the field windings.

4. The rotor structure according to claim 1, wherein a plurality of planar surfaces, on which the teeth are to be disposed, are formed along the inner circumferential surface of the core tip part at regular intervals, and the through-holes are formed at adjacent portions of the planar surfaces.

5. The rotor structure according to claim 1, wherein the first slide connection portion and the second slide connection portion are integrally connected to each other when being slidably connected to each other through a mating engagement.

6. A rotor structure for a motor, comprising:
a core body in which a shaft passes through an axial center and teeth are radially arranged along an outer circumference and include first slide connection portions at front ends;
field windings individually wound around outer circumferences of the teeth and maintaining a state of being spaced apart from one another while being wound around the teeth; and
a cylindrical core tip part configured to surround the outside of the core body, the cylindrical core tip part including second slide connection portions in an inner circumference such that the front ends of the teeth are slidably connected thereto along an axial direction through a mating engagement,
wherein through-holes are formed along an axial direction of the core tip part, and
wherein planar surfaces, on which the teeth are to be disposed, are formed along an inner circumferential surface of the core tip part at regular intervals, and the through-holes are formed at adjacent portions of the planar surfaces.

7. The rotor structure according to claim 6, wherein:
the first slide connection portion is a concave groove having a length in an axial direction of the core body and becomes wider backward from an opened front end, and
the second slide connection portion is a concave protrusion that is slidably connected to the first slide connection portion through a mating engagement.

8. The rotor structure according to claim 6, wherein the through-holes are formed along a circumferential direction so as to insert needles through spacing portions of the teeth from the outside at the time of winding the field windings.

9. The rotor structure according to claim 6, further comprising concave grooves in the inner circumferential surface of the core tip part, wherein the concave grooves have a length along an axial direction at positions of the through-holes.

10. The rotor structure according to claim 6, wherein the first slide connection portion and the second slide connection portion are integrally connected to each other when being slidably connected to each other through a mating engagement.

* * * * *